United States Patent
Varekamp

(10) Patent No.: US 10,580,154 B2
(45) Date of Patent: Mar. 3, 2020

(54) METHOD AND APPARATUS FOR DETERMINING A DEPTH MAP FOR AN IMAGE

(71) Applicant: KONINKLIJKE PHILIPS N.V., Eindhoven (NL)

(72) Inventor: Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 15 days.

(21) Appl. No.: 15/569,184

(22) PCT Filed: May 6, 2016

(86) PCT No.: PCT/EP2016/060221
§ 371 (c)(1),
(2) Date: Oct. 25, 2017

(87) PCT Pub. No.: WO2016/184700
PCT Pub. Date: Nov. 24, 2016

(65) Prior Publication Data
US 2018/0150964 A1    May 31, 2018

(30) Foreign Application Priority Data

May 21, 2015  (EP) .................................. 15168577

(51) Int. Cl.
*G06T 7/593*    (2017.01)
*G06K 9/32*    (2006.01)
(Continued)

(52) U.S. Cl.
CPC .......... *G06T 7/593* (2017.01); *G06K 9/00208* (2013.01); *G06K 9/3266* (2013.01);
(Continued)

(58) Field of Classification Search
CPC ... G06T 7/50; G06T 7/97; G06T 2207/10028; G06T 7/11; H04N 13/128; H04N 13/271; H04N 13/395; H04N 2013/0081
See application file for complete search history.

(56) References Cited

U.S. PATENT DOCUMENTS 9,189,859 B2 *  11/2015  Vogiatis ............... H04N 13/221
2007/0140577 A1 *  6/2007  Ahmed .................... G06K 9/38
                                                          382/254

(Continued)

FOREIGN PATENT DOCUMENTS

WO    2006117707 A2    11/2006

OTHER PUBLICATIONS

Sullivan et al "A New Nonlinear Optimization Algorithm for Asymmetric FIR Digital Filters" Circuits and Systems, 1994 vol. 2, May 30, 1994 p. 541-544.

(Continued)

*Primary Examiner* — Santiago Garcia

(57) ABSTRACT

An apparatus for determining a depth map for an image comprises an image unit (105) which provides an image with an associated depth map comprising depth values for at least some pixels of the image. A probability unit (107) determines a probability map for the image comprising probability values indicative of a probability that pixels belong to a text image object. A depth unit (109) generates a modified depth map where the modified depth values are determined as weighted combinations of the input values and a text image object depth value corresponding to a preferred depth for text. The weighting is dependent on the probability value for the pixels. The approach provides a softer depth modification for text objects resulting in reduced artefacts and degradations e.g. when performing view shifting using depth maps.

20 Claims, 5 Drawing Sheets

(51) Int. Cl.
*H04N 13/128* (2018.01)
*G06T 5/00* (2006.01)
*G06T 7/11* (2017.01)
*G06T 7/143* (2017.01)
*G06K 9/00* (2006.01)
*G06K 9/62* (2006.01)
*G06T 5/30* (2006.01)
*H04N 13/183* (2018.01)
*H04N 13/00* (2018.01)

(52) U.S. Cl.
CPC ......... *G06K 9/6257* (2013.01); *G06K 9/6277* (2013.01); *G06K 9/6284* (2013.01); *G06K 9/6292* (2013.01); *G06T 5/002* (2013.01); *G06T 5/30* (2013.01); *G06T 7/11* (2017.01); *G06T 7/143* (2017.01); *H04N 13/128* (2018.05); *H04N 13/183* (2018.05); *G06T 2207/10012* (2013.01); *G06T 2207/10028* (2013.01); *G06T 2207/20076* (2013.01); *G06T 2207/20182* (2013.01); *H04N 2013/0081* (2013.01)

(56) References Cited

U.S. PATENT DOCUMENTS

| | | |
|---|---|---|
| 2010/0046837 A1 | 2/2010 | Boughorbel |
| 2011/0170801 A1* | 7/2011 | Lu .................. G06T 3/4007 382/298 |
| 2013/0084007 A1* | 4/2013 | Salamati ............ G06T 7/162 382/173 |
| 2013/0100260 A1 | 4/2013 | Tanaka |
| 2013/0124148 A1* | 5/2013 | Jin ................ G06F 17/5086 703/1 |
| 2013/0156294 A1* | 6/2013 | Wei ............... G06K 9/00691 382/154 |
| 2014/0055450 A1* | 2/2014 | Limonov .......... H04N 21/4882 345/419 |
| 2014/0307056 A1* | 10/2014 | Collet Romea ....... H04N 5/272 348/47 |
| 2014/0333720 A1 | 11/2014 | Huang |
| 2015/0302592 A1* | 10/2015 | Bruls .................. G06T 7/13 348/44 |
| 2016/0173851 A1* | 6/2016 | Kim .................. G06K 9/46 382/154 |
| 2018/0129919 A1* | 5/2018 | Tang ................ G06K 9/4628 |
| 2018/0150444 A1* | 5/2018 | Kasina ............. G06F 17/241 |

OTHER PUBLICATIONS

Anonymous Softmax Function—Wikipedia May 13, 2015.
Freund et al "A Short Introduction to Boosting" Journal of Japanse Society for Artificial Intelligence (5) p. 771-780 Sep. 1999.

* cited by examiner (a)  (b)

METHOD AND APPARATUS FOR DETERMINING A DEPTH MAP FOR AN IMAGE

CROSS-REFERENCE TO PRIOR APPLICATIONS

This application is the U.S. National Phase application under 35 U.S.C. § 371 of International Application No. PCT/EP2016/060221, filed on May 6, 2016, which claims the benefit of EP Patent Application No. EP 15168577.3, filed on May 21, 2015. These applications are hereby incorporated by reference herein.

FIELD OF THE INVENTION

The invention relates to a method and apparatus for determining a depth map for an image, and in particular for determining a depth map based on estimated disparity values.

BACKGROUND OF THE INVENTION

Three dimensional (3D) displays add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

However, practical displays tend to not have ideal performance and are typically not able to present perfect three dimensional images.

For example, lenticular based auto-stereoscopic 3D displays tend to suffer from out-of-screen blur. This effect is similar to what is known as depth-of-field blur in camera systems.

Also, the quality of the presented three dimensional image depends on the quality of the received image data, and specifically the three dimensional perception depends on the quality of the received depth information.

Three dimensional image information is often provided by a plurality of images corresponding to different view directions for the scene. Specifically, video content, such as films or television programs, are increasingly generated to include some 3D information. Such information can be captured using dedicated 3D cameras that capture two simultaneous images from slightly offset camera positions.

However, in many applications, the provided images may not directly correspond to the desired directions, or more images may be required. For example, for autostereoscopic displays, more than two images are required and indeed often 9-26 view images are used.

In order to generate images corresponding to different view directions, view point shifting processing may be employed. This is typically performed by a view shifting algorithm which uses an image for a single view direction together with associated depth information. However, in order to generate new view images without significant artefacts, the provided depth information must be sufficiently accurate.

Unfortunately, in many applications and use scenarios, the depth information may not be as accurate as desired. Indeed, in many scenarios depth information is generated by estimating and extracting depth values by comparing view images for different view directions.

In many applications, three dimensional scenes are captured as stereo images using two cameras at slightly different positions. Specific depth values may then be generated by estimating disparities between corresponding image objects in the two images. However, such depth extraction and estimation is problematic and tends to result in non-ideal depth values. This may again result in artefacts and a degraded three dimensional image quality.

Three dimensional image degradation and artefacts tend to be particularly significant for text image objects, such as e.g. subtitle blocks. Rather than being part of the scene, text image objects tend to be isolated objects that are not perceived as being integrated or embedded in the scene. Further, depth variations for text image objects tend to be more perceptible to the viewer. Also, in a typical application, text (such as especially subtitles) is expected to be sharp and in focus with well-defined edges. Accordingly, it is of high importance to in particular present text image objects, such as subtitle blocks, with a high image quality.

Hence, an improved approach for determining suitable depth information for text image objects would be advantageous and in particular an approach allowing increased flexibility, facilitated implementation, reduced complexity, an improved 3D experience and/or improved perceived image quality would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a depth map for an image, the apparatus comprising: an image unit for providing a first image with an associated depth map comprising first depth values for at least some pixels of the first image; a probability unit for determining a probability map for the first image comprising probability values for at least some pixels of the image; the probability value for a pixel being indicative of a probability that the pixel belongs to a text image object; a depth unit for generating a modified depth map for the first image, the depth unit being arranged to determine a modified depth value for at least a first pixel as a weighted combination of a first depth value of the associated depth map for the first pixel and a text image object depth value, the weighting being dependent on the probability value for the first pixel.

The approach may in many embodiments allow an improved depth map to be generated which when used for image processing may provide improved quality. For example, in many embodiments and scenarios, an improved presentation of text image objects, such as subtitles, may be achieved using the modified depth map. The improvement may in particular be significant when the modified depth map is used for image view shifting and/or when presenting three dimensional images on an autostereoscopic display. The approach may further allow a shift of presentation depth for text image objects while mitigating or reducing degradations, inconsistencies and/or artefacts.

The maps may be full or partial maps. For example, the probability map may comprise probability values for only a subset of pixels/pixel groups. The probability value for a given pixel may represent an estimate of the probability or likelihood that the pixel belongs to (is part of) a text image object. For example, the probability value may be an indication of how closely a determined value of a property matches a value expected for a text image object. For example, processing may be applied to the first image to generate a value (or set of values). The probability that the pixel belongs to a text image object may be represented by how closely the value matches an expected value. For example, processing may be applied to the first image that results in a number in an interval of [a;b] where e.g. a=0 and b=1. For a pixel belonging to a text image object, the determined property may be expected to be b whereas for a pixel not belonging to a text image object, the value may be expected to be a. The determined value may thus directly be a property value indicative of a probability that the corresponding pixel belongs to a text image object or not. For example, for a=0 and b=1, the higher the value, the more likely it is that the corresponding pixel belongs to the text image object. The exact processing and determination of the value may be different in different embodiments depending on the preferences and requirements of the individual embodiment.

A text image object may be a region/area/subset or segment of the image which comprises text. A text image object may specifically be a subtitle image object. A text image object may correspond to one or more characters or may e.g. include bounding region for the text.

The weighted combination may specifically be a weighted summation of the first depth value and the text image object depth value with the weights being a function of the probability value. In some embodiments, the weighted combination may specifically be a weighted summation of a monotonic function of the first depth value and the text image object depth value, with the weights being a function of the probability value.

The text image object depth value may be a predetermined value. The text image object depth value may specifically be a fixed and/or constant value in the time and/or spatial domain. The text image object depth value may be a desired depth for text image objects. The text image object depth value may indicate a preferred depth for text image objects, and may be a fixed and/or predetermined value. Specifically, the text image object depth value may indicate a preferred depth for text image objects and may be independent of depth properties of a scene represented by the first image. Indeed, the text image objects may typically be overlay graphics which are not part of the scene represented by the first image, and the text image object depth value may represent a preferred depth for overlay graphics/text image objects that are not part of the scene. The text image object depth value is associated with text image objects and may be the same for a plurality of pixels or pixel groups. In many embodiments, the text image object depth value is independent of properties of the first image and/or the associated depth map.

The first image may be an image which is part of a plurality of images corresponding to different viewing angles or may e.g. be a single isolated and independent image (having an associated depth map). In some embodiments, the first image may be an image of a temporal sequence of images, such as e.g. a frame from a video sequence.

In accordance with an optional feature of the invention, the probability unit is arranged to determine pixel groups for the first image, each pixel group comprising a plurality of pixels; and wherein the probability unit is arranged to determine probability values for pixel groups.

This may provide improved performance and/or facilitated operation and/or reduced complexity and/or resource demand. The determined probability value for a pixel group may be assigned to all pixels belonging to the pixel group.

In accordance with an optional feature of the invention, the depth unit is arranged to determine weights for the weighted combination in response to a first probability value for a pixel group to which the first pixel belongs and a second probability value for a neighboring pixel group; a weighting of the first probability value and the second probability value being dependent on a position of the first pixel in the pixel group to which the first pixel belongs.

This may allow improved performance in many scenarios. Specifically, the approach may allow a determination of probability values at a lower resolution than the image pixel resolution while allowing the effective resolution to be increased for the combination of depth levels.

In some embodiments the weights for the weighted combination may be determined in response to an interpolated probability value, the interpolated probability value being determined in response to a spatial interpolation between a first probability value for a pixel group to which the first pixel belongs and a second probability value for a neighboring pixel group; the interpolation being dependent on a position of the first pixel in the pixel group to which the first pixel belongs.

The probability map may comprises a plurality of probability values, and specifically may comprise a plurality of probability values for each of a plurality of pixels or pixel groups. Similarly, the combination may be performed for each pixel with at least some pixels having different probability values and thus having independent combinations. Thus, the probability values and combination may vary across the image (it may be different for different pixels).

In accordance with an optional feature of the invention, the probability unit is arranged to determine probability values for pixel groups of the image, each pixel group comprising at least one pixel; the probability unit being arranged to first determine a classification map comprising values for the pixel groups indicating whether the pixel groups are designated as belonging to a text image object or not belonging to a text image object; and to generate the probability map in response to filtering of the classification map.

This may provide facilitated implementation and/or improved performance/results.

In accordance with an optional feature of the invention, the classification map comprises binary values for the pixel groups, each binary value indicating either that a pixel group is designated as belonging to a text image object or that the pixel group is designated as not belonging to a text image object.

This may provide facilitated implementation and/or improved performance/results. In particular, it may in many scenarios allow a more robust and reliable initial classification of pixel groups. The filtering may convert the binary classification to non-binary probability values which also reflect the characteristics of the temporal and/or spatial neighborhood of the pixel group.

In accordance with an optional feature of the invention, the filtering comprises a binary dilation filtering applied to the classification map.

This may improve performance and may in particular improve the consistency of detected areas corresponding to text image objects. In many scenarios, it may reduce hole formation in such areas.

In accordance with an optional feature of the invention, the filtering comprises a temporal filtering.

This may for example allow improved stability and consistency and provide an improved user experience, e.g. when viewing images generated by view shifting based on the modified depth map.

In accordance with an optional feature of the invention, the temporal filtering is asymmetric.

This may provide improved performance in many applications and scenarios.

In accordance with an optional feature of the invention, the filtering comprises spatial filtering.

This may provide improved performance in many applications and scenarios.

In accordance with an optional feature of the invention, the spatial filtering comprises a softmax filter.

This may provide improved performance in many applications and scenarios. In particular, it may allow advantageous depth profiles to be generated for areas corresponding to text image objects. E.g. in many scenarios, the softmax filter may allow the generation of a consistent depth region corresponding to a text image object while reducing the amount or size of holes and/or while providing a soft transition at edges of the text image object.

A softmax filter may be a cascade of a filter and a limiter which limits the output to a maximum value. For example, a softmax low-pass filter may perform an operation corresponding to a cascade of a low-pass filter and a limiter limiting the output value of the low-pass filter to a maximum value. Thus, a softmax filter may correspond to a filter having a maximum output value limit.

In accordance with an optional feature of the invention, the spatial filtering comprises at least two sequential spatial softmax filters.

This may provide improved performance in many applications and scenarios. In particular, it may allow advantageous depth profiles to be generated for areas corresponding to text image objects. E.g. in many scenarios, the softmax filters may allow the generation of a consistent depth region corresponding to a text image object. In many embodiments, the filters may reduce the amount or size of holes while also providing a soft transition at edges of the text image object.

The two sequential spatial softmax filters may be arranged to have different design/operating parameters, and specifically a kernel dimension, scale factor and/or maximum value may be different for the two filters. In many embodiments, the parameters for a first filter may be optimized for reducing hole formation and providing increased consistency while the parameters of the second filter may be optimized to provide a desired depth transition profile at edges of the text image object.

In accordance with an optional feature of the invention, the first depth values correspond to disparities for image objects in a plurality of images corresponding to different view directions for a scene of the first image.

The invention may in many embodiments improve a depth map generated by disparity estimation, and may specifically mitigate degradations and artefacts associated with text image objects.

In some embodiments, the image unit is arranged to estimate the disparities for the image objects in the plurality of images.

In accordance with an optional feature of the invention, a weighting of the text image object depth is increased and a weighting of the first depth value is reduced for an increasing value of the probability value.

This may provide improved performance in many applications and scenarios.

According to an aspect of the invention there is provided a method of determining a depth map for an image, the method comprising: providing a first image with an associated depth map comprising first depth values for at least some pixels of the first image; determining a probability map for the first image comprising probability values for at least some pixels of the image; the probability value for a pixel being indicative of a probability that the pixel belongs to a text image object; and generating a modified depth map for the first image, the generating comprising determining a modified depth value for at least a first pixel as a weighted combination of a first depth value of the associated depth map for the first pixel and a text image object depth value, the weighting being dependent on the probability value for the first pixel.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a system for determining a modified depth map for use in generating images for different view directions of a scene, such as for example an approach for generating additional images for presentation of an input stereo image on an autostereoscopic display. However, it will be appreciated that the invention is not limited to this application but may be applied to many other applications and systems.

Figure 1:
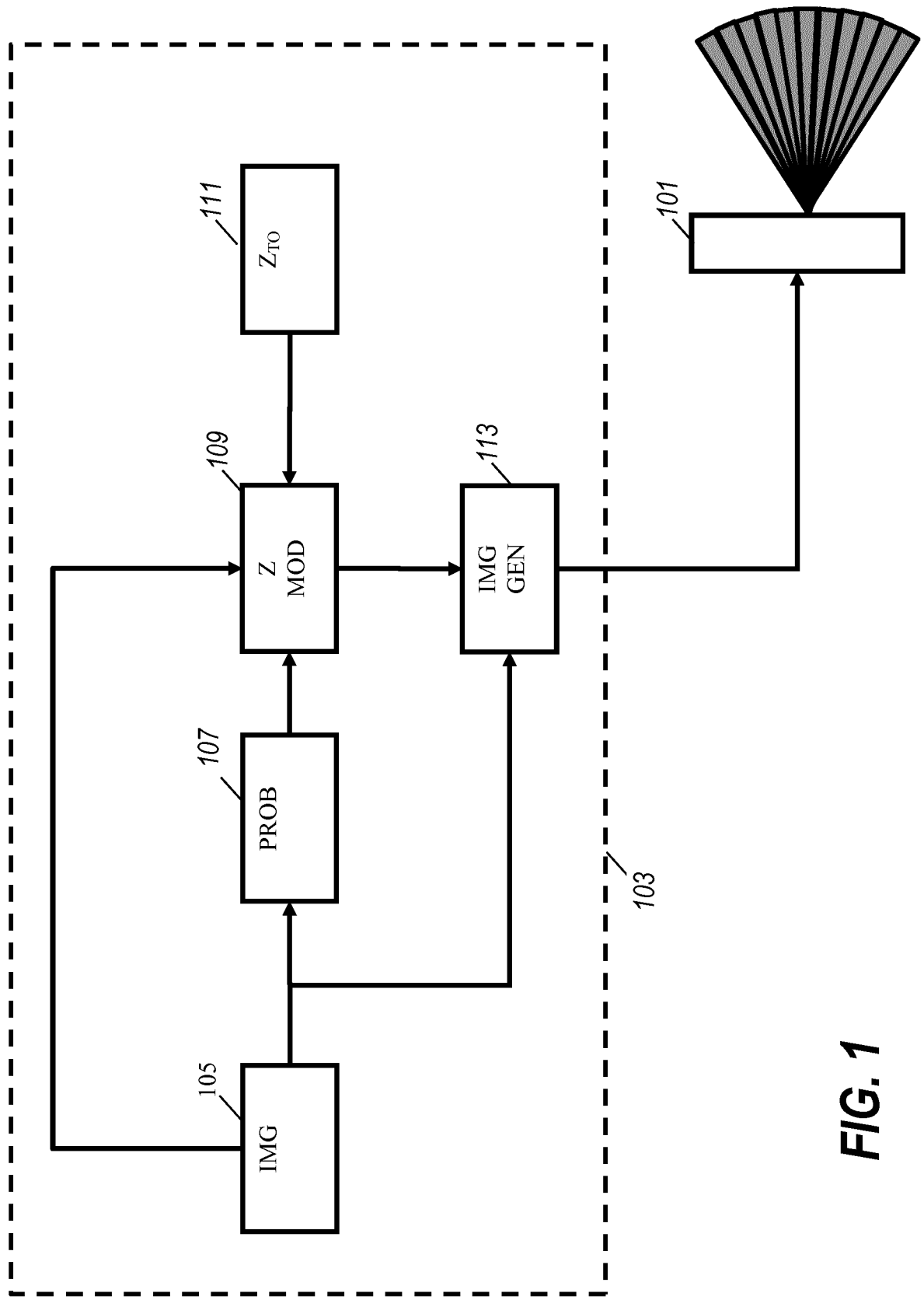
FIG. 1 is an illustration of an example of a display system comprising an apparatus in accordance with some embodiments of the prior art.

FIG. 1 illustrates an example of a system in accordance with some embodiments of the window. In the specific example, images corresponding to different views of an autostereoscopic display 101 is generated from an input three dimensional image. The input three dimensional image may for example be represented by a single image with an associated depth map, or may e.g. be represented by stereo images from which an associated depth map is extracted. In some embodiments, the image may be an image from a temporal sequence of images, such as a frame from a video sequence/signal.

Figure 2:
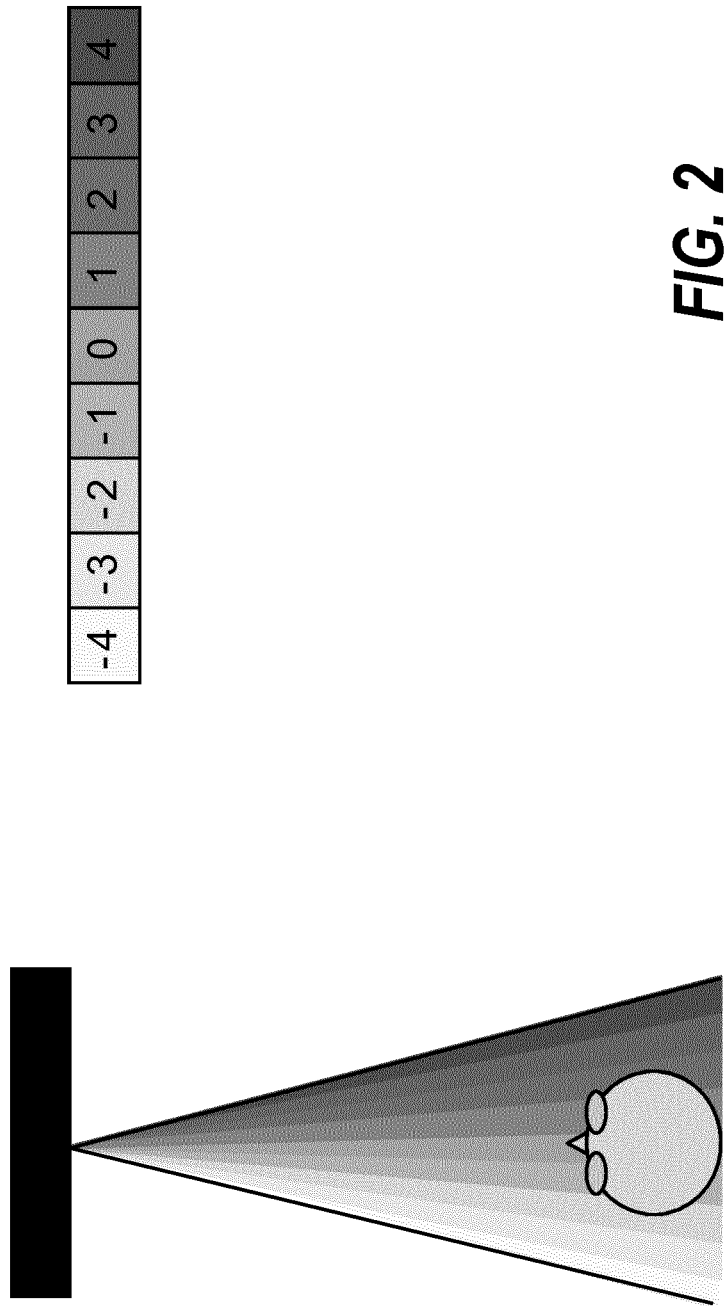
FIG. 2 illustrates an example of view images being projected from an autostereoscopic display.

Typically, autostereoscopic displays produce "cones" of views where each cone contains multiple views that correspond to different viewing angles of a scene. The viewing angle difference between adjacent (or in some cases further displaced) views are generated to correspond to the viewing angle difference between a user's right and left eye. Accordingly, a viewer whose left and right eye see two appropriate views will perceive a three dimensional effect. An example of an autostereoscopic display generating nine different views in each viewing cone is illustrated in FIG. 2.

Autostereoscopic displays tend to use means, such as lenticular lenses or parallax barriers/barrier masks, to separate views and to send them in different directions such that they individually reach the user's eyes. For stereo displays, two views are required but most autostereoscopic displays typically utilize more views. Indeed, in some displays a gradual transition of view directions is performed over an image such that different parts of an image may be projected in different viewing directions. Thus, in some more recent autostereoscopic displays a more gradual and continuous distribution of image regions over view directions may be applied rather than the autostereoscopic display rendering a fixed number of complete views. Such an autostereoscopic display is often referred to as providing fractional views rather than full views. More information on fractional views may e.g. be found in WO 2006/117707.

However, common for most autostereoscopic displays is that they require image information to be generated for a relatively large number of different view directions. However, typically three dimensional image data is provided as stereo image or as an image with a depth map. In order to generate the required view directions, image view shifting algorithms are typically applied to generate suitable pixel values for rendering. However, such algorithms are typically suboptimal and may introduce artefacts or distortions.

The Inventors have realized that such artefacts, degradations, and quality reductions may be particularly prevalent, perceptible, and/or significant in connection with text image objects, such as in particular subtitle image objects. Thus, when images containing text are received and presented e.g. by an autostereoscopic display, artefacts may often be perceived around subtitle blocks and similar text objects.

In order to address such issues, algorithms may be applied to seek to identify such image objects. A fixed depth level may then be applied to the identified image objects in order to position all text at a fixed depth. However, such detection is typically very difficult and an accurate segmentation into text image objects (and non-text image objects) is typically not feasible. As a result, such approaches often also result in perceptible artefacts.

Figure 3:
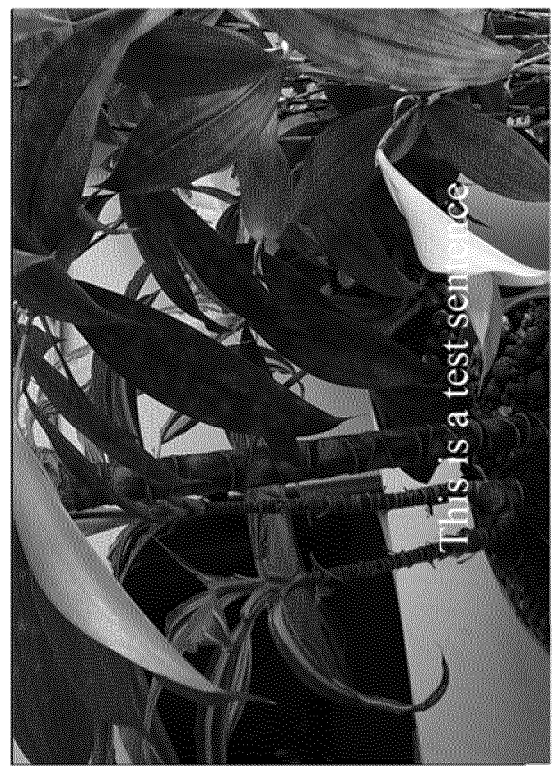
FIG. 3 illustrates an example of an image and associated detected text areas.
Figure 3:
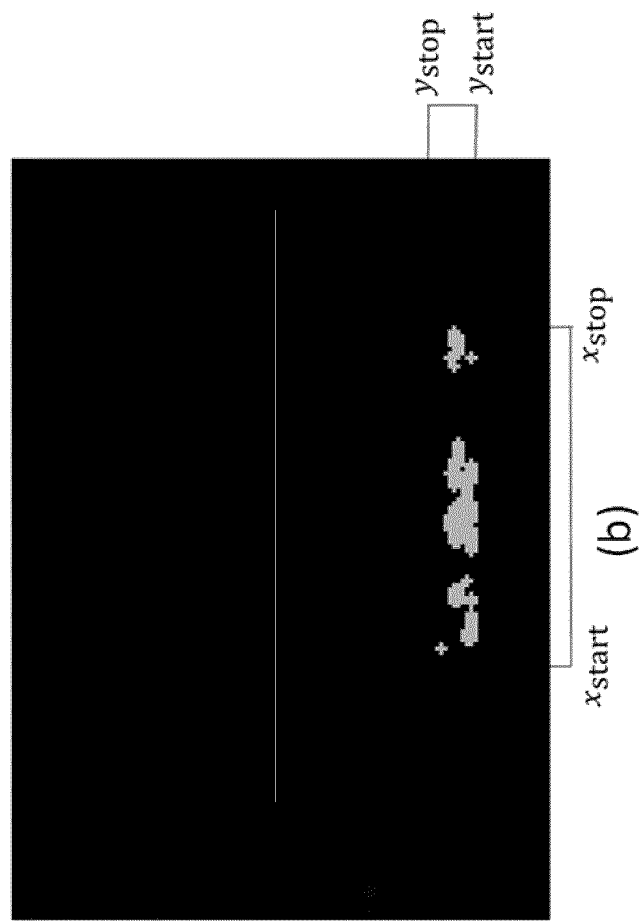

For example, a subtitle box may be identified and the depth level for this box may be set to the screen depth. FIG. 3 illustrates an example of how this may be done The subtitle box is used to place subtitles at screen depth. FIG. 3 illustrates how this can be done. In the example, a subtitle box is detected in a luminance image with subtitle text (FIG. 3a). In the example, detection may be performed per 8×8 block of pixels using features extracted from within each 8×8 block. Each black block may first be classified as being part of a subtitle (shown by white in FIG. 3b) or not (shown by black in FIG. 3b). Finally, a bounding subtitle box is determined by integrating the detection results first horizontally and finding a start and stop position along the y-coordinate, and then by integrating detection results horizontally and finding a start and stop position for the x-coordinate. Specifically, the boundaries of the subtitle box may be set to the smallest rectangle that includes all blocks classified as belonging to the subtitle box.

The depth for all pixels within the subtitle box may then be set to a specific depth value, and specifically may be set to the screen or display depth. This may reduce artefacts and may reduce blur introduced by the autostereoscopic display to objects that are not at screen level. The approach may be illustrated by FIG. 4 which shows an image with a section 401 that lies behind the screen depth and a section 403 that lies in front of the screen depth. The described approach may identify a subtitle block 405 and position this at the screen depth.

Figure 4:
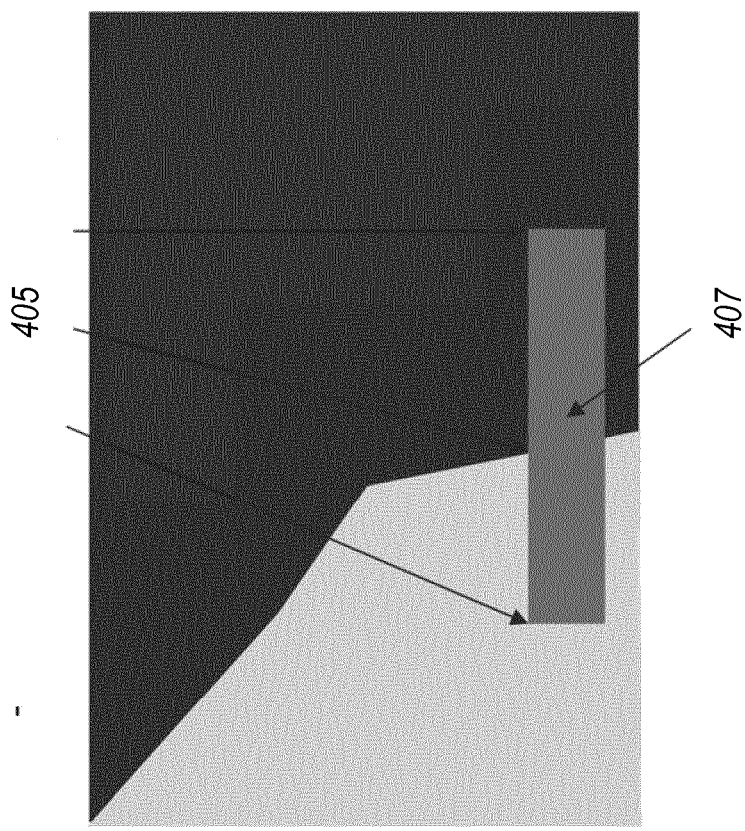
FIG. 4 illustrates an example of positioning a subtitle block in a depth map.
Figure 4:
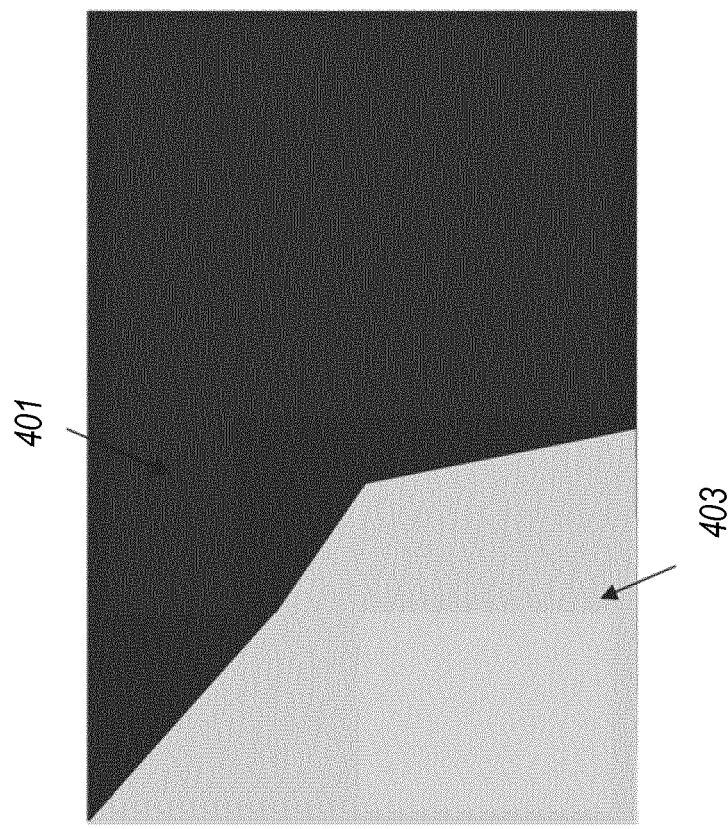

However, while this solution will result in a sharp (specifically without out-of-screen blur) and geometrically correct subtitle object, the newly introduced steep edges in the depth map (due to the text box) may often result in very visible texture distortions (break-up) near the boundary of the text box (such as indicated by 407 in FIG. 4). Moreover, when the textbox itself falls apart into multiple smaller text boxes, rendering errors will also become visible. For example, some characters in a sentence may be sharp while others may be blurred. Moreover, this behavior can change rapidly over time which in practice tends to be quite visible to the viewer.

It has in practice been found that seeking to identify a subtitle region and setting the depth of this region to (in particular) the screen depth typically results in various problems. Firstly, noise in the detection algorithm may frequently cause the detected box to fall apart into two or more separate boxes. This may happen due to multiple start and stop locations possibly existing along the x- and/or the y-coordinate. Moreover, the start and stop location of a detected box tends to be sensitive to classification errors. As a result, the resulting depth map may become temporally unstable resulting in visible temporal errors in the images displayed by the auto-stereoscopic display.

The apparatus of FIG. 1 may mitigate or reduce some of the disadvantages known from known approaches. The apparatus comprises a display driver 103 driving the autostereoscopic display 101. The display driver 103 comprises functionality for generating a plurality of view images for the autostereoscopic display 101 and to feed these thereto. The view images are generated for different view directions using a view shifting algorithm which as an input has an input image and a depth map.

However, rather than merely identifying and setting a subtitle region to a screen depth, the system is arranged to process an input depth map (received from an external source or an internal source and often being generated by the display driver 103 from images corresponding to different view directions, such as specifically a stereo image) to generate a modified depth map in which a more subtle rearrangement of subtitle depth is employed. This will tend to provide a substantially improved visual experience including a reduction or mitigation of visible artifacts around subtitles or other text image objects.

The approach of the display driver 103 involves first generating a probability map, also referred to as an a-map, comprising probability values that are indicative of whether the corresponding pixels belong to a text image object or not. Thus, rather than a simple binary designation determining whether a given pixel, or pixel group, is a text image object or not, the probability map provides non-binary, and often substantially continuous, values which are indicative of an estimated probability that the pixel, or pixel group, belongs to a text image object or not. The probability values of the probability map, also referred to as a-values, are typically represented by discrete values, and in most embodiments each value may be represented by values with at least 4, but typically at least 8, 16, 32, 64, 128, 256 or even more discrete levels. In many embodiments, each probability value may be represented by a binary value of at least 3, 4, 6, 8, 10 or 16 bits.

In the approach, the depth level for at least some pixels is not generated simply by either selecting an original depth value or setting it to a predetermined depth level (such as screen level). Rather, at least some depth values of the modified depth map are generated by performing a weighted combination of on original depth value and a text image object depth value which is specifically a preferred depth level for text image objects (such as the screen depth). The weighting of the depth levels for a given pixel is determined based on the probability value for that pixel.

Specifically, if α[i,j] denotes the value of the probability map at pixel location [i,j], the modified depth level for the modified depth map may be determined as:

$$D_{mod}[i,j] = \alpha[i,j]D_{text} + (1-\alpha[i,j])D[i,j].$$

where $D_{text}$ denotes the text image object depth and D[i,j] is the original depth level.

Thus, in the approach, the modified depth map is generated to provide depth levels which more continuously spans the difference between the original depth level and the depth level desired for text image objects. In this way, the text image object may effectively be spatially (in the depth direction) "blended" between the original depth presentation and the desired depth.

Such an approach has in practice been found to provide substantially more appealing visual experiences with a significantly reduced perception of artifacts and degradations around text image objects, such as specifically subtitle blocks.

Another advantage of the approach is that by using the text image object detection results to generate a probability map, this can be subjected to spatial and temporal filters to improve the resulting rendering images. Furthermore, such filtering can be performed without affecting the original depth map.

The display driver 103 comprises an image unit 105 which is arranged to provide an image with an associated depth map that comprises depth values for at least some pixels of the image. The image will be referred to as an input image and the depth map as the input depth map (and the pixel and depth values as input pixel and depth values).

The image unit 105 may in some embodiments be arranged to simply receive the input image and the input depth map from any suitable internal or external source. For example, a video signal comprising three dimensional images represented by an image and an associated depth map may be received from a network (such as the Internet), a broadcast signal, a media carrier etc.

In some embodiments, the image unit 105 may be arranged to generate the input image and/or the input depth map. Specifically, in many embodiments, the image unit 105 may be arranged to receive a three dimensional image formed by a plurality of images corresponding to different view directions, such as specifically a stereo image, and it may be arranged to perform disparity estimation to generate the input depth map.

The depth values comprised in the depth maps may be any suitable representation of depth, such as specifically a depth coordinate (z) value or a disparity value representing shifts between images of different view directions.

In the example, the input depth values are observed or estimated depth values. Specifically, they may be values which are generated by disparity estimation performed either at an external source or by the image unit 105 itself. Accordingly, the depth values will often be relatively inaccurate and may contain a number of mistakes and errors.

Also, in the input signal, the text image object, such as subtitles, may not be positioned at the preferred depth when rendered on the autostereoscopic display. This may for example be due to the technically optimally depth (e.g. with respect to sharpness) varying for different displays or due to subjective preferences varying between applications.

For example, for television programs and motion pictures, subtitles are typically positioned in front of the screen, i.e. at a depth level which makes the subtitles appear to be in front of the screen, and often as the most forward object. However, for many autostereoscopic displays, substantially increased blur is introduced for such depth levels, and therefore it may be preferred to position the subtitles at the screen depth. As described, the display driver 103 may accordingly perform a gradual readjustment of the depth levels for estimated text image objects.

Specifically, the image unit 105 is coupled to a probability unit 107 which is arranged to generate a probability map comprising probability values that are indicative of a probability or likelihood that the corresponding pixel belongs to a text image object.

The probability value for a given pixel may represent an estimate of the probability or likelihood that it belongs to a text image object. The probability may for example be an indication of how closely a pixel group comprising the pixel matches a set of expected characteristics for text image objects. The closer the match, the higher the probability that the pixel belongs to a text image object.

The probability of a pixel belonging to a text image object may be based on a consideration that a text image object includes only pixels that are part of a text character. However, in many embodiments, a text image object may typically be considered to include a bounding box. For example, a text image object may be considered to include a surrounding subtitle box. It will be appreciated that the exact characteristics and properties considered to represent a text image object will depend on the specific preferences and requirements of the individual embodiment, and that in particular the determination of the probability values can be adapted to reflect the preferred characteristics and properties of what is considered to be a text box.

For example, in some embodiments, subtitles may be provided e.g. as white characters in a grey or black box. In such an example, it may be highly desirable to consider the text image object to include the entire subtitle box, i.e. the probability may be determined to indicate the probability of the pixels belonging to a subtitle box resulting in a gradual positioning of the subtitle box at a desired depth. In other applications, subtitles may be provided simply as white characters on top of the underlying image. In such an example, there is no bounding box and the probability may reflect the probability of a pixel belonging to a text character.

In many embodiments, the text image object may specifically be a graphics overlay image object, and specifically may be a subtitle or title image object.

It will be appreciated that various approaches for determining the probability map may be used in different embodiments, and a specific example providing highly efficient operation with high performance will be described later.

The probability unit 107 is coupled to a depth unit 109 which is arranged to generate the modified depth map. The depth unit 109 is further coupled to image unit 105 and a memory/store 111 wherein the text image object depth value is stored. The depth unit 109 accordingly receives the input depth map, the text image object depth value, and the probability map and it proceeds to perform the weighted combination of the input depth values and the text image object depth values where the weighting depends on the probability value.

Specifically, as previously described, the combination may be a linear combination such as specifically a weighted summation of the input depth value and the text image object depth value with the weights being dependent on the probability value. However, it will be appreciated that other weighted combinations can be used where the relative contribution from the input depth level and the text image object depth level is dependent on the probability value. For example, in some embodiments, non-linear combinations may be used.

Thus, the combination (for a given pixel) provides an output depth value as a function of the input depth value, the text image object depth value, and the probability value (for the pixel) with the contribution to the output depth value from respectively the input depth value and the text image object depth value depending on the probability value The weighted combination is such that the weighting of the text image object depth is increased and a weighting of the first depth value is reduced for an increasing value of the probability value. Thus, the more probable it is estimated to be that a given pixel belongs to a text image object, the closer the output depth value will be to the text image object depth value, and the less probable it is estimated to be that a given pixel belongs to a text image object, the closer the output depth value will be to the input depth value. The exact relationship will depend on the preferences and requirements of the individual embodiment.

In many embodiments, the output depth value may for a given pixel be a function of the probability value where the function is a function that for a probability value of zero outputs the input depth value for the pixel and for a probability of one outputs the text image object depth value. The function of the probability value may specifically be a monotonic function. The function of the probability value may for a given pixel map the probability range from 0 to 1 to the depth value range from the input depth value for the pixel to the text image object depth value.

In most embodiments, the text image object depth value may be a predetermined value, and specifically may be a constant value for all images and/or for the entire image. However, in some embodiments, the text image object depth value may vary between different regions of the image, e.g. a preferred text image object depth value for a lower part of the image may be different from the preferred text image object depth value for an upper part of the image.

The depth unit 109 is in the example coupled to an image generator 113 which is arranged to generate view images for the autostereoscopic display 101. The image generator 113 receives the modified depth map from the depth unit 109 and is further coupled to the image unit 105 from which it receives the input image. The image generator 113 is arranged to generate the view images for the autostereoscopic display 101 by performing view shifting to generate view images for the specific view directions associated with the different views produced by the autostereoscopic display 101. The image generator 113 is arranged to generate these images by a view shifting algorithm based on the input image and the modified depth map. Thus, the view images will be generated to present the pixels at depths that gradually reflect whether they are considered likely to belong to text image objects or not. As a result, the projected three dimensional image perceived by a viewer will tend to have more consistent rendering of a text image object with a more gradual transition between text image objects and other image regions. This will typically substantially reduce the perceived imperfections of the 3D presentation.

Thus, in the example, the input image and the modified depth map are used by the image generator 113 to generate an image of the scene of the input image but with a different view direction than the view direction of the input image.

It will be appreciated that the skilled person will be aware of many different view shifting algorithms and that any suitable algorithm may be used without detracting from the invention.

In some embodiments, the image unit 105 may directly receive a depth map together with an input image. In some cases, the depth maps may be generated at the same time and place as text image objects are included in or added to e.g. a captured image. In some cases, the depth map may therefore be generated to have depth levels for text image objects such as subtitles which is at a specific preferred depth. Thus, the depth map may for a text image object have a full complete and consistent region corresponding to the area of the text image object and the depth values in this region may all be identical. This may allow the text image object be positioned with little error and few artefacts. However, even in this case, the depth level of the text image object may not be the preferred depth level for the specific use scenario. For example, a depth level suitable for viewing using a glasses based approach may not be ideal for presentation using an autostereoscopic display. Further, sharp depth transitions may still result in artefacts when performing view shifting.

Furthermore, in many applications, the depth map may not be generated at the same time and placed as the inclusion of a text image object (such as subtitles). For example, in many scenarios, a three dimensional image may be represented by stereo images with subtitles included in both images and with the depth of the subtitles being controlled by the disparity between the two stereo images. Such a three dimensional stereo representation does not include any depth map and therefore such a map may if needed be generated as a post-processing operation. Indeed, in many scenarios, the depth map may be generated in the end user device.

For example, the image unit 105 may be arranged to receive a plurality of images which correspond to different view directions for the same scene. Specifically, a stereo image may be received comprising a left eye image and a right eye image. The stereo image may include a text image object, e.g. a subtitle, with the depth of this being reflected by the disparity between the two images.

The image unit 105 may then be arranged to generate a depth map in response to a disparity detection between the view direction images. Thus, the image unit 105 may proceed to find corresponding image objects in the images, determine the relative shift/disparity between these, and assign the corresponding depth level to the image objects. It will be appreciated that any suitable algorithm for determining depth based on disparity estimation may be used.

Such a disparity estimation may lead to relatively accurate depth maps. However, the depth maps will still typically comprise a relatively large number of errors and will typically not be fully consistent. In particular, artefacts and inconsistencies may be prevalent around large and sharp depth transitions which may often in particular occur for text image objects.

Therefore, directly using a depth map generated from disparity estimation for images for different directions will tend to result in perceived quality degradation and introduction of artefacts, e.g. when performing view shifting.

However, the generation of a modified depth map based on probability detections and a merging of the disparity determined depth value and a desired depth value for text image object tends to result in a substantially improved image and specifically in a substantially improved perceived quality around text image objects with increased consistency and reduced artefacts. In particular, the presence of errors, inconsistencies or artefacts that may typically occur around text image objects when performing disparity estimation may be substantially mitigated by the described approach.

In the following, a specific approach for determining the probability map will be described.

In the approach, the determination of the probability values may be performed for pixel groups that may comprise a plurality of pixels. Thus, whereas the principles described in the following may be applied to individual pixels, they are in the specific example performed on a pixel group basis, and specifically on a rectangular block basis. In the specific example, each pixel group is a block of 8×8 pixels.

Accordingly, in the example, the probability unit 107 comprises functionality for determining pixel groups for the input image where each pixel group comprises a plurality of pixels. The determination of probability values is then based on these pixel groups.

In the approach, the probability unit 107 is arranged to first determine a classification map comprising values for the pixel groups where each value indicates whether the corresponding pixel group is designated as belonging to a text image object or not belonging to a text image object.

In the specific described embodiment, the classification values are binary values and each value accordingly indicates that the corresponding pixel group is designated as belonging to a text image object or that the pixel group is designated as not belonging to a text image object. This approach may in many embodiments facilitate the classification process and may generate robust decisions. Furthermore, it may facilitate the processing and has been found to result in probability maps that are highly suited for the following blending or combination of different depth levels. Indeed, it has been found to result in the generation of three dimensional images being perceived to be of high quality.

However, it will be appreciated that in other embodiments, the values of the classification map may be non-binary values. For example, the object classification process may generate soft decision values for indicating whether the pixel groups belong to a text image object or not. E.g. the values may be a set of discrete values in the interval of [0;1] where 1 represents a designation as belonging to a text image object and 0 represents a designation of not belonging to a text image object and with values in between reflecting how closely the pixel group is considered to match the requirements for being designated as belonging to a text image object. Indeed, the values may in some embodiments be considered as initial probability values and the classification map may be considered as an initial probability map.

The probability unit 107 may apply a text image object classification process to the input image which provides a binary decision indicating whether each pixel group belongs to a text image object or not.

It will be appreciated that different algorithms may be used for designating the pixel groups as belonging to a text image object or not. As a simple example, the color distribution within a pixel group may be evaluated and if that predominantly comprises pixel colors corresponding to those used for subtitle boxes (e.g. white and black), the pixel group may be designated as being a text image object and otherwise it may be designated as not being a text image object.

It will be appreciated that in most embodiments, a substantially more complex classification or designation algorithm may be used. For example, a classification may be based on multiple features that are calculated for each block. Features may for instance be the average horizontal pixel gradient and the number of pixels within a certain bin of a pixel intensity histogram. A machine learning approach such as AdaBoost (http://cseweb.ucsd.edu/~yfreund/papers/IntroToBoosting.pdf; date: 20 May 2015) may then be used to (automatically) train a so called 'strong classifier' by linearly combining for instance 50 'weak' classification rules. Note that typically a much larger set of candidate features (e.g. >300) is used to select from, such that a good selection can be made. To obtain such a large set of candidate features, the basic features, such as average horizontal pixel gradient, are each used as input to multiple spatial convolution (filter) operations with varying kernel size and thus can each generate e.g. 10 new feature candidates. Training of the classifier is at 8×8 block level using a given set of training images. The resulting algorithm may then be used to classify each block as belonging to a text image object or not.

As mentioned, the generated classification values are in the described example binary values that indicate either that a pixel group is designated as belonging to a text image object or that it is designated as not belonging to a text image object. However, in some embodiments, the classification process may generate soft-decision values and these may be used instead of binary values. For example, an AdaBoost classifier may internally use and generate soft decision indications which are compared to a threshold in order to designate the pixel group. However, in some embodiments, these soft-decision values may instead be used for the classification map without any comparison to a threshold to generate binary values.

The second phase for generating the probability map is to proceed to apply a filtering to the generated classification map. The filtering may impose temporal and spatial restrictions and smoothing to the classification map.

In particular, when the classification process returns binary hard decision classification results, these initial binary values may be transformed into non-binary values that are indicative of the probability of individual pixel groups (or pixels) belonging to a text image object or not. Thus, the initial binary classification/designation may be converted into gradual non-binary probability values by filtering being applied to the classification map. This conversion not only allows efficient processing with relatively low complexity and resource requirements but has also been found to provide very good results with the probability values reflecting not only the classification of the group itself but also how this relates to other classifications in the temporal and/or spatial neighborhood of the pixel group. Indeed, the approach tends to result in generation of a probability map which has a high degree of consistency and which is highly suitable for the manipulation of depths of text image objects.

The filtering may comprise a plurality of filtering operations. In many embodiments, the filtering may comprise a plurality of sequential filtering operations with typically a subsequent filtering operation being performed on the result of the previous filtering operation.

In the following, an example of a specific approach with a plurality of sequential filtering operations being performed will be described. However, it will be appreciated that this is merely an example and that in different embodiments only a subset of the described filter operations may be used, and that the order of filter operations may be different in other embodiments. For example, in some embodiments, temporal filtering may be applied before spatial filtering whereas in other embodiments spatial filtering may be applied before temporal filtering.

In the example, the filter operations are performed at a pixel group resolution where each pixel group comprises a plurality of pixels. In particular, all filters operate at 8×8 block resolution. In the description, indices [m,n] will accordingly refer to block indices. The resulting probability map will also be at block resolution. During the generation of the modified depth map, the probability values may be interpolated to provide a higher resolution and specifically to provide pixel level resolution. As a specific example, α[m,n] may be (e.g. linearly) interpolated to calculate α[i,j] which is at pixel level.

In some embodiments, the filtering may include a binary dilation filtering applied to the classification map.

For example, $\alpha_{init}[m,n]$ may denote the raw detection result at block indices [m,n] i.e. the binary values of the classification map. The raw detection result either takes the value of 1 (belonging to a text image object) or 0 (not belonging to a text image object). In order to increase the density of the result (i.e. to increase the size of detected areas), $\alpha_{init}[m,n]$ may first be filtered using a (typically binary) dilation filter, such as specifically a morphological dilation filter having a 'cross-shape':

$$\alpha_{dil}[m,n] = \max(\alpha_{init}[m,n], \alpha_{init}[m+1,n], \alpha_{init}[m,n+1], \alpha_{init}[m-1,n], \alpha_{init}[m,n-1]).$$

In this way, the areas detected as belonging to text image objects are increased thereby increasing the likelihood that text image object pixel groups are included and providing an increased overlap etc. between these.

The probability unit 107 may also apply a low pass temporal filtering. If a dilation filtering is performed, the temporal filtering may be applied to the result of this filtering. Otherwise, it may e.g. be applied directly to the classification map.

In many embodiments, the temporal filtering may be asymmetric, i.e. the low pass effect may be more significant in one direction than the other. Specifically, the time constant for changing to increase the likelihood of pixel groups belonging to text image objects is lower than the time constant for changing to decrease the likelihood of pixel groups belonging to text image objects.

As a specific example, a temporal, asymmetric recursive filter may be applied to e.g. the output of the dilation filter (or e.g. directly to the classification map). A specific example of a filter suitable for many embodiments may be the following:

$$\alpha_{tmp}^{(t)} = \begin{cases} \frac{1}{4}\alpha_{tmp}^{(t-1)} + \frac{3}{4}\alpha_{dil}^{(t)} & \text{if } \alpha_{dil}^{(t)} > \alpha_{tmp}^{(t-1)} \\ \frac{7}{8}\alpha_{tmp}^{(t-1)} + \frac{1}{8}\alpha_{dil}^{(t)} & \text{otherwise} \end{cases},$$

where superscript t refers to a frame number.

This filter may ensure that when text is first detected, the depth will be modified quickly. However, the effect of text on the depth map will only reduce gradually when the text is removed. The net effect is better temporal stability. Note that $\alpha_{dil}^{(t)}$ is typically set to zero for all blocks for t=0.

In some embodiments, the filtering comprises spatial filtering. This filtering may be performed directly on the classification map (e.g. after dilation filtering if such is included) or may e.g. be performed after temporal filtering.

In some embodiments, the spatial filtering may be a linear low pass filter. However, in many embodiments, the spatial filtering may specifically include at least one softmax filter.

A softmax filter may be a cascade of filter and a limiter which limits the output to a maximum value. For example, a softmax low-pass filter may perform an operation corresponding to a cascade of a low-pass filter and a limiter limiting the output value of the low-pass filter to a maximum value. Thus, a softmax filter may correspond to a filter having a maximum output value limit. The maximum value may be a value of 1 but it will be appreciated that this may differ between different embodiments.

Specifically, a softmax filter may be a filter which performs a standard filter operation such as a low-pass filter, but multiplies the filter output with a value greater than 1, such that the filter output is biased to higher values, after which the minimum is taken of the thus obtained output and a pre-defined maximum value. A softmax filter defined in this way thus consists of three components: a (standard) filter operation, a multiplication factor, and a pre-set maximum. Thus, a softmax filtering may comprise applying a spatial (low pass) filtering with a limiting of the filter output to a maximum value. Typically, the low pass filtering may be a two stage process of first filtering using a (typically normalized) low pass filter followed by a scaling of the filter output values by a scale factor which is typically predetermined. The resulting scaled output is then limited to the maximum value. However, the scaling may be considered as part of the overall filtering and could for example be implemented by e.g. scaling (kernel) coefficients of the spatial filter. The maximum value is typically predetermined.

The use of a softmax filter may provide improved performance. In particular, it may tend to generate regions in which the inner pixels are indicated to (almost certainly) be text image objects while providing a soft and gradual transition towards the borders of the region. Such a characteristic is particularly suitable for identifying e.g. subtitle boxes using probability values.

In some embodiments, the spatial filtering may comprise at least two sequential spatial soft-max filters. The different softmax filters may have different characteristics. Specifically, the spatial filtering may provide two functions. One is to fill the regions corresponding to text image objects, i.e. to make the detected areas overlap such that there are preferably no gaps within the detected regions. The other is to provide a spatial smoothing such that the transitions around the detected areas are smooth and gradual. Both functions result in an improved visual experience.

Thus, in the specific example, a first softmax filter may be applied to "fill in" detected regions corresponding to text image objects. A second softmax filter may then be applied to the result of the first softmax filter to generate smooth transitions.

As a specific example, following the temporal filtering, some text objects may result in a very sparsely filled map of indications of areas belonging to text image objects. Therefore, in order to fill holes inside e.g. a subtitle box, a 'soft-max' filter may be applied. E.g. a softmax filter with a kernel height of 21 blocks and kernel width of 35 blocks may be used:

$$\alpha_{softmax}[m, n] = \min\left(\frac{\sum_{p=m-10}^{m+10}\sum_{q=n-17}^{n+17}\alpha_{tmp}[p, q]}{K_1}, 1\right),$$

where $$K_1 < \sum_{p=m-10}^{m+10}\sum_{q=n-17}^{n+17}\alpha_{tmp}[p, q].$$

As a specific example α may be represented by 8-bit numbers such that a value of 1 is represented by 255. In this example, a value of $K_1=32$ may often be used. Such a softmax filter may in many embodiments fill holes between characters and words.

This first softmax filter may be followed by a second softmax filter which seeks to remove the hard spatial border between a region of the depth map corresponding to a text image object and the surrounding areas of the depth map, and thus to provide a soft transition between text and the rest of the three dimensional image when this is presented.

The second softmax filter may correspond to the first one but with different parameters, and specifically with a larger denominator such that the filter acts more like a low-pass filter and less like a max-filter. In the specific example, a kernel size of height 11 and width 25 pixels may be used:

$$\alpha[m, n] = \min\left(\frac{\sum_{p=m-5}^{m+5}\sum_{q=n-12}^{n+12}\alpha_{softmax}[p, q]}{K_2}, 1\right),$$

Again, α may represented by 8-bit numbers, and a suitable value for the denominator may be $K_2=256$.

The use of two sequential softmax filters may not only result in improved performance but may also allow facilitated implementation. Specifically, the same algorithm or function may be used with just the parameter values being changed. Indeed, in many embodiments even image data may be more efficiently (re)used, such as e.g. by using an integral image approach.

Figure 5:
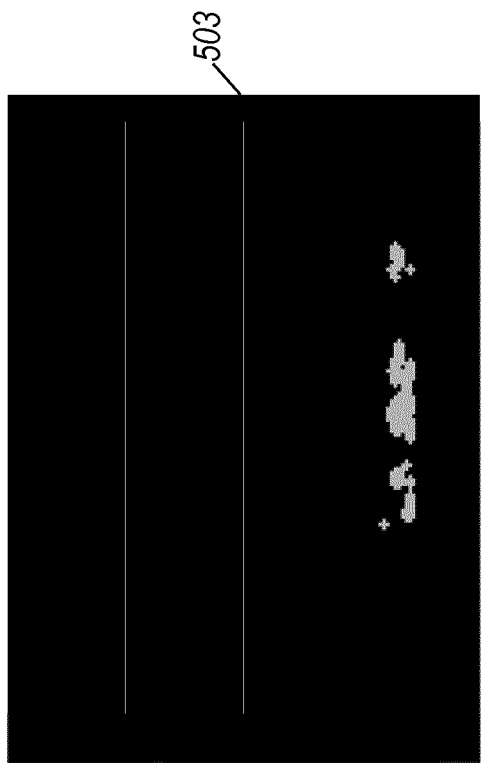
FIG. 5 illustrates examples of an input image and probability maps generated therefor in an apparatus in accordance with some embodiments of the invention.
Figure 5:
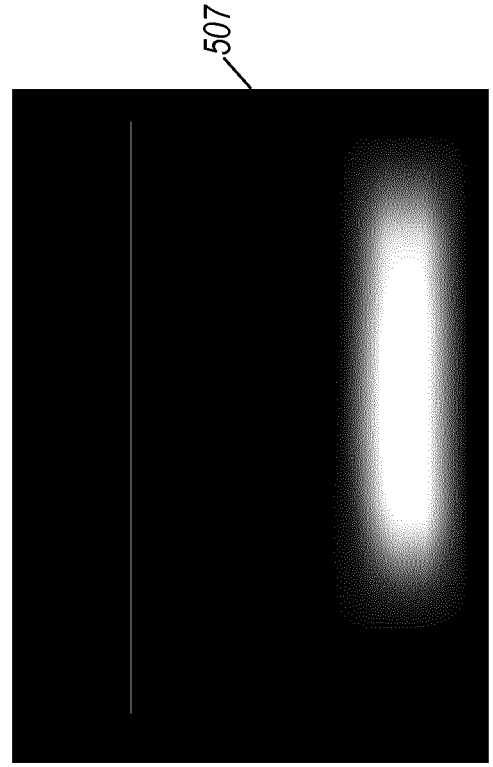
Figure 5:
Figure 5:
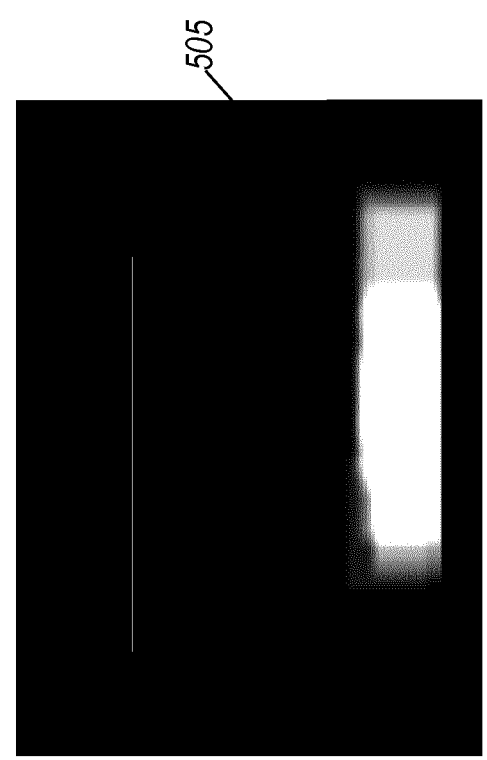

FIG. 5 illustrates examples of the results of the described exemplary approach for determining the probability map. FIG. 5 shows the input image 501 and the classification map 503 after binary dilation filtering and temporal filtering. As can be seen, the probability map at this stage can be very sparsely populated (white indicates areas with high probability of belonging to a text image object and black indicates areas with low probability of belonging to a text image object). The output 505 of the first softmax filter is shown. As can be seen, this filtering results in a significantly increased area being considered to be likely to belong to a text image object. However, the transition is quite abrupt. The output 507 of the second softmax filter is also shown. As can be seen, this corresponds fairly closely to the output of the first softmax filter but has substantially smoothed transitions resulting in a much more gradual depth transition in the image rendered by the autostereoscopic display 101.

In the described example, the classification map and the filtering/processing thereof was performed using pixel groups, and specifically pixel blocks, comprising a plurality of pixels. Indeed, in the example, blocks of 8×8 pixels were used. This reduces the resolution by a factor of 64 and accordingly can allow a substantially more efficient and less demanding operation. Furthermore, the Inventor has realized that this resolution reduction can be applied while still achieving desirable performance and perceived image quality.

However, in order to improve the perceived image quality, the weights for the weighted combination may be generated at a higher resolution than at the block level resolution, and may specifically be generated at the pixel resolution.

This may be achieved by using interpolation between the block based depth values. For example, interpolation between probability values for neighboring blocks may be used to generate depth values for individual pixels of the blocks. The weights for the interpolation may be determined based on the position of the pixel in the pixel group.

For example, interpolation between a first and second depth value may be performed. For a pixel substantially on the border between the pixel groups for the first and second depth value, the depth value may be determined by substantially equally weighting the first and second depth values. E.g. a simple averaging may be performed. However, for a pixel in the center of one pixel group, the depth value may be determined simply as the depth value determined for that pixel group.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for determining a depth map for an image, the apparatus comprising: an image circuit arranged to provide a first image with an associated depth map, the depth map comprising first depth values for at least some pixels of the first image; a probability circuit arranged to determine a probability map for the first image, the probability map comprising probability values for at least some pixels of the first image, wherein the probability value for a pixel is indicative of a probability that the pixel belongs to a text image object; and a depth circuit arranged to generate a modified depth map for the first image, wherein the depth circuit is arranged to determine a modified depth value for at least a first pixel, wherein the modified depth value is a weighted combination of a first depth value of the associated depth map for the first pixel and a text image object depth value, wherein the weighting is dependent on the probability value for the first pixel; and wherein the weighting is not uniform.

2. The apparatus of claim 1,
wherein the probability circuit is arranged to determine pixel groups for the first image,
wherein each pixel group comprises a plurality of pixels,
wherein the probability circuit is arranged to determine probability values for pixel groups.

3. The apparatus of claim 2,
wherein the depth circuit is arranged to determine weights for the weighted combination in response to a first probability value for a pixel group,
wherein the first pixel belongs to the pixel group,
wherein the depth circuit is arranged to determine a second probability value for a neighboring pixel group,
wherein a weighting of the first probability value and the second probability value is dependent on a position of the first pixel in the pixel group.

4. The apparatus of claim 1,
wherein the probability circuit is arranged to determine probability values for pixel groups of the image,
wherein each pixel group comprises at least one pixel,
wherein the probability circuit is arranged to determine a classification map,
wherein the classification map comprises values for the pixel groups indicating whether the pixel groups are designated as belonging to a text image object or not belonging to a text image object,
wherein the probability circuit is arranged to generate the probability map in response to filtering of the classification map.

5. The apparatus of claim 4,
wherein the classification map comprises binary values for the pixel groups,
wherein each binary value indicates either that a pixel group is designated as belonging to a text image object or that the pixel group is designated as not belonging to a text image object.

6. The apparatus of claim 5, wherein the filtering comprises a binary dilation filtering applied to the classification map.

7. The apparatus of claim 4, wherein the filtering comprises a temporal filtering.

8. The apparatus of claim 7, wherein the temporal filtering is asymmetric.

9. The apparatus of claim 4, wherein the filtering comprises spatial filtering.

10. The apparatus of claim 9, wherein the spatial filtering comprises a softmax filter.

11. The apparatus of claim 9, wherein the spatial filtering comprises at least two sequential spatial softmax filters.

12. The apparatus of claim 1, wherein the first depth values correspond to disparities for image objects in a plurality of images corresponding to different view directions for a scene of the first image.

13. The apparatus of claim 1, wherein a weighting of the text image object depth value is increased and a weighting of the first depth values is reduced for an increasing value of the probability values.

14. A method of determining a depth map for an image, the method comprising; providing a first image with an associated depth map, the depth map comprising first depth values for at least some pixels of the first image; determining a probability map for the first image, the probability map comprising probability values for at least some pixels of the first image; wherein the probability value for a pixel is indicative of a probability that the pixel belongs to a text image object; and generating a modified depth map for the first image, wherein a modified depth value for at least a first pixel is a weighted combination of a first depth value of the associated depth map for the first pixel and a text image object depth value, wherein the weighting is dependent on the probability value for the first pixel; and wherein the weighting is not uniform.

15. A non-transitory computer-readable storage medium that stores instructions, which when executed by a processor, cause the processor to perform the method as claimed in claim 14.

16. The method of claim 14, further comprising:
determining pixel groups for the first image, wherein each pixel group comprises a plurality of pixels; and
determining probability values for pixel groups.

17. The method of claim 16, further comprising:
determining weights for the weighted combination in response to a first probability value for a pixel group, wherein the first pixel belongs to the pixel group; and
determining a second probability value for a neighboring pixel group,
wherein a weighting of the first probability value and the second probability value is dependent on a position of the first pixel in the pixel group.

18. The method of claim 14, further comprising:
determining probability values for pixel groups of the image, wherein each pixel group comprises at least one pixel;
determining a classification map, wherein the classification map comprises values for the pixel groups indicating whether the pixel groups are designated as belonging to a text image object or not belonging to a text image object; and
generating the probability map in response to filtering of the classification map.

19. The method of claim 18,
wherein the classification map comprises binary values for the pixel groups, wherein each binary value indicates either that a pixel group is designated as belonging to a text image object or that the pixel group is designated as not belonging to a text image object.

20. The method of claim 19, wherein the filtering comprises a binary dilation filtering applied to the classification map.

* * * * *